Aug. 12, 1941. D. G. C. LUCK 2,252,083
RADIO TRAFFIC CONTROL
Filed April 23, 1938
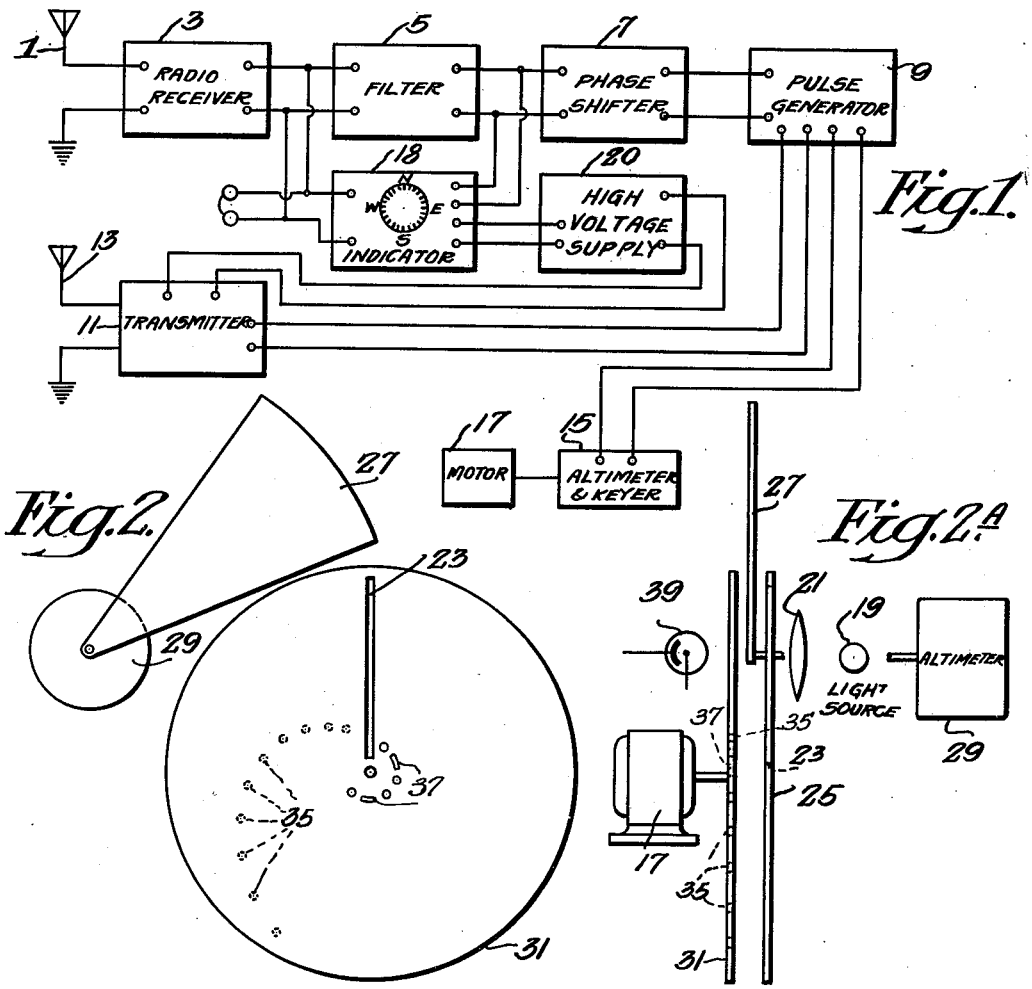
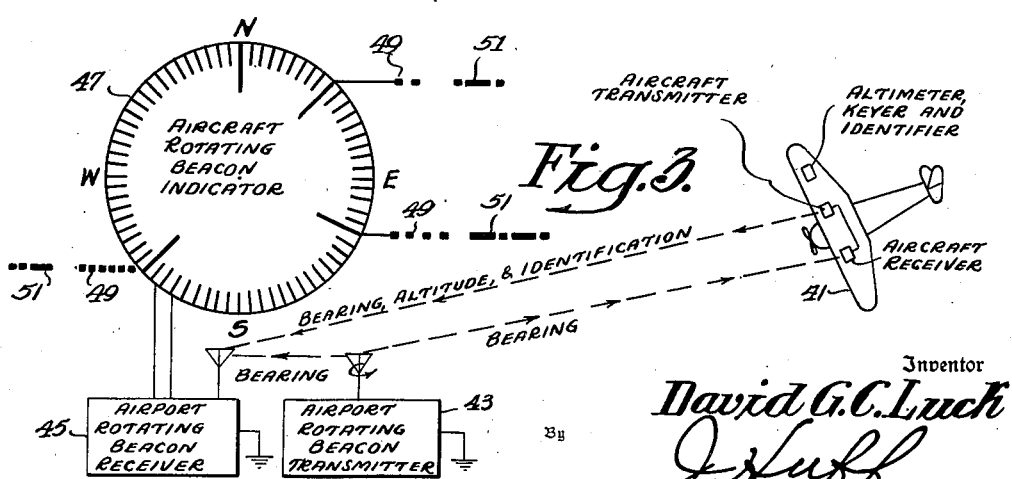
Inventor
David G. C. Luck
By J. Huff
Attorney Patented Aug. 12, 1941

2,252,083

UNITED STATES PATENT OFFICE 2,252,083

RADIO TRAFFIC CONTROL

David G. C. Luck, Haddon Heights, N. J., assignor to Radio Corporation of America, a corporation of Delaware Application April 23, 1938, Serial No. 203,750

8 Claims. (Cl. 250—11)

This invention relates to a radio system for traffic control and especially to a system for controlling the traffic of aircraft in the vicinity of an airport.

The growth of air travel has made it desirable to regulate the traffic of aircraft approaching a landing place. This is particularly true with respect to an airport which maintains a closely arranged schedule of landings and takeoffs. During periods of poor visibility it is necessary to regulate the arrivals and departures of aircraft by radio communication. Generally a dispatcher at the airport advises the pilots of approaching craft of the altitudes and positions they are to maintain until given the signal for a landing. The dispatcher attempts to keep a suitable record of the various approaching craft, their altitude, position, and the like, but this represents a difficult problem with a crowded schedule.

As one of the objects of the invention, means are provided to visually indicate to a dispatcher the bearing of one or more aircraft approaching an airport. Another object is to provide means for identifying an aircraft, and its bearing and altitude with respect to an airport. A further object is to provide means on an aircraft whereby a signal from a rotating beacon at the airport keys an aircraft transmitter which sends signals from the aircraft to a suitable direction indicating receiver located at the airport. A still further object is to provide means on an aircraft for automatically transmitting information identifying the craft, its altitude, and bearing.

The invention will be described by referring to the accompanying drawing in which Figure 1 is a schematic diagram of the aircraft receiver and transmitter which are employed in transmitting the identifying, bearing and altitude information;

Figures 2 and 2A are front and side views of the transmitter keying mechanism; and Figure 3 is an illustration of the complete system and airport control indicator.

In applying this invention to traffic control, use is made of a rotating radio beacon preferably of the type disclosed in U. S. Patent No. 2,208,376 entitled "Rotating radio beacon," which issued on application Serial No. 156,055, filed July 28, 1937, by D. G. C. Luck. A suitable circuit arrangement for the airport rotating beacon transmitter is shown in Fig. 1 of the said patent. The four antennas 53, 55, 69, 71 are energized in phase quadrature. Thus energized, these antennas establish a rotating field. A circular field is established by the central antenna 35. Either or both fields are interrupted at the instant when the maximum of the rotating field is due north, thus establishing a reference signal. A receiver (see Fig. 4 of the patent) located within the fields, responsive to the carrier frequency, produces by a conventional process of demodulation an alternating current and a reference pulse. The alternating current corresponds to the radiated rotating field; the reference pulse corresponds to the field interruption.

The alternating current may be applied to the deflecting electrodes 143, 145 of a cathode ray tube 147 to produce a circular trace. The reference pulse signal, applied to the control electrode 151, will interrupt the circular trace. At the receiver the relation between the relative phase of the two derived signals, or corresponding point of the cathode ray trace interruption, depends upon the position of the receiver with respect to the transmitter.

If the output of an aircraft receiver, responsive to the airport beacon, is connected through a filter 5 (which eliminates the reference pulse), the alternating current signal may be used to initiate new pulses at, for example, the positive peaks of the current. If these newly initiated pulses are used to key a transmitter 11, the aircraft transmitter pulse phase will be determined by the aircraft position with respect to the rotating beacon transmitter.

If a second receiver is located near the rotating beacon transmitter, and is tuned to the aircraft transmitter and to the beacon transmitter, its cathode ray trace will necessarily be synchronized with the rotating field and the receiver will be responsive to the two pulse signals: One of these pulse signals is the normal reference pulse of the beacon; the other is the aircraft transmitter pulse. The normal reference pulse marks the cathode ray trace to indicate the fixed bearing of the receiver at the beacon. The aircraft pulse will cause the cathode ray trace to be indicated at an angular position corresponding to the aircraft bearing.

The aircraft receiver-transmitter is shown in Fig. 1 in which an antenna 1 is coupled to a conventional radio receiver 3. The output of the receiver is applied through a filter 5 and a phase shifter 7 to a pulse generator 9. The pulse generator is connected to a transmitter 11, which is coupled to a transmitting antenna 13. The pulse generator is also connected to an altimeter and keying device 15 which is driven by a motor 17. A cathode ray indicator 18 is connected across the filter and to a high voltage source 20. The indicator is operated by the application of the received signals which include the information indicating the bearing of the aircraft in accordance with the operation of the rotating beacon transmitter as described in the aforementioned patent.

The altitude and keying device are shown in Figs. 2 and 2A. A beam from a light source 19 is focused by a lens 21 on a slit 23 in a mask 25. A shield 27 is moved across the slit by an altimeter 29. A disc 31 is rotated past the slit by a motor 33. The disc includes two sets of apertures; one set 35 of uniform size is arranged in a spiral; the other set represents dots and dashes 37 of an identifying code. The spiral apertures represent the altitude in thousands of feet. The dot-dash apertures may be arranged in telegraphic code. The light passing the slit 23, mask 27 and apertures 35, 37 is arranged to fall on a photoelectric cell 39 which provides a source of keying or signalling current. The keying currents are applied to the pulse generator, which is keyed on and off in the manner of any modulated carrier transmitter for the transmission of conventional dot, dash and space telegraphic characters. For example, a dot might contain several pulses, a dash might include three to five times the number of pulses in a dot, and a space would not include any pulses. Regardless of the number of pulses or the telegraphic signal every pulse would convey bearing information. One suitable pulse generator is shown in the lower left-hand portion of Fig. 1 of the aforementioned patent. The pulse generator may be keyed by applying the keying currents to block the rectifier 73 or tubes 81, 83.

The operation of the device is as follows: The receiver-transmitter is carried on an aircraft 41 as shown in Fig. 3. The receiver is tuned to a rotating beacon 43 which is preferably located near the airport from which the traffic is controlled. The output of the receiver will include a sharply defined reference impulse current and a sinusoidal current. The former is rejected by the filter 5 and applied directly to the indicator 18; the latter is passed through the filter and then applied to the indicator and to a phase shifter 7. The audio currents from the phase shifter control a pulse generator which generates sharply defined pulses as a function of the phase of the applied currents. The generated pulses are keyed by the altitude and identifying signals from the keyer to thereby actuate the transmitter 11 which radiates a pulse which has a phase with respect to the reference impulse which corresponds to the bearing of the receiver with respect to the rotating beacon station.

Pulses transmitted from the aircraft transmitter give the bearing of the aircraft by actuating a receiver 45 at the airport which may be responsive to both the rotating beacon and the transmitter on the aircraft. The indicator 47 may be a cathode ray tube having its fluorescent spot uniformly swept over a circular path by a sinusoidal reference voltage which is synchronous with the rotation of the directive pattern transmitted by the beacon. The intensity of the spot is modulated, or the spot is radially deflected, by the output pulses from the airport radio receiver. The received pulses from the aircraft will be slowly keyed on and off to indicate the altitude 49 and identifying code 51. The altitude is indicated by a flash for each thousand feet—for example, five flashes corresponds to five thousand feet. The altimeter 29 automatically selects the number of flashes by shielding the apertures corresponding to the higher altitudes. Likewise, the indicating receiver flashes, by varying durations of the cathode ray trace, dots and dashes which for each bearing indicate the identity of the aircraft from which the transmission is effected. The identifying and altitude information are alternately transmitted. The azimuth position of the flashes indicates the bearing as shown in Fig. 3.

One of the advantages of the foregoing system is that all of the transmitters can be operated on a single frequency. This is especially desirable because it enables a single receiver to continuously indicate the bearings of a plurality of aircraft. Furthermore, each aircraft may be apprised not only of its own bearing but the bearings of other aircraft by the use of receivers responsive to both beacon and aircraft carrier frequencies. The transmitter is automatically operated and, since the high voltage is only needed for brief instants during the transmitted impulses, the voltage may be derived by charging a capacitor, from the cathode ray high voltage source, and using such charge to operate the transmitter during the brief keying periods. The phase of the outgoing signal may be adjusted by the phase shifter so that it coincides with the required phase as indicated by direct pickup at the receiver 1 and indicator 18, thus compensating for time lag in the receiving system. Furthermore, the dispatcher can communicate over the non-directional carrier of the beacon without interrupting the rotating beacon. Since the details of the circuits represented by block diagram are either well known to those skilled in the art or may be found in the above mentioned copending application, no detailed description is needed.

I claim as my invention:

1. A radio traffic control device including in combination a radio transmitter, a radio receiver responsive to a carrier modulated by an alternating current, demodulation means for obtaining from said carrier said alternating current, means for deriving a keying pulse from said alternating current having a phase fixedly related to said current, said pulse being substantially less in duration than a cycle of said alternating current, and means for applying said pulse to momentarily key on said radio transmitter.

2. A radio traffic control including a rotating beacon transmitter for establishing a rotating field, said field having a modulation phase varying as the bearing of said receiver with respect to said beacon transmitter, a radio transmitter, a radio receiver responsive to said rotating field, said radio transmitter and said radio receiver being arranged for movement on a common vehicle, means for establishing a keying pulse at a fixed phase with respect to said variable phase, means for adjusting the phase of said keying pulse, and means for applying said keying pulse to said radio transmitter.

3. A radio traffic control for mobile craft including a fixedly located rotating beacon, a receiver located on said craft and responsive to signals from said rotating beacon transmitter, means for deriving from said received signals a keying pulse corresponding in phase to the bearing of the receiver with respect to the beacon transmitter as determined by said receiver response, a radio transmitter located on said craft, means for applying said keying impulse to said craft transmitter, said keying corresponding to the bearing of the receiver with respect to the beacon transmitter, and means for radiating signals including said pulse to convey bearing information from said craft transmitter.

4. In a device of the character of claim 3 means for varying the radiation of said radiated signals as a function of the altitude of the craft carrying said receiver-transmitter.

5. In a device of the character of claim 3, means for applying identifying signals to the signals radiated from said craft.

6. In a device of the character of claim 3, means for impressing identifying and altitude determining signals to the signals radiated from said craft.

7. The method of signalling which includes radiating a rotating beacon signal including a sinusoidal modulation and a reference pulse, receiving said signal, deriving from said sinusoidally modulated radio signal a sinusoidal current, deriving from said current a train of pulses definitely phased with respect thereto, each of said pulses being substantially shorter in duration than a cycle of said derived sinusoidal current, generating a carrier wave, applying said pulses to modulate said carrier wave, and radiating said modulated carrier wave.

8. The method of signalling which includes radiating rotating beacon signals including a sinusoidal modulation and reference pulses fixed in phase with respect to said modulation, receiving said signals, deriving from said sinusoidally modulated radio signal a sinusoidal current, deriving from said current a train of pulses definitely phased with respect thereto, generating a carrier wave, applying said pulses to modulate said carrier wave, radiating said modulated carrier wave, receiving said pulse modulated carrier wave, demodulating said carrier wave, establishing a reference phase with respect to the original modulation of said radio signal and indicating the phase of said pulses with respect to said reference phase.

DAVID G. C. LUCK.